United States Patent
Kulkarni et al.

(10) Patent No.: US 9,986,371 B2
(45) Date of Patent: May 29, 2018

(54) NFC POWER MANAGEMENT DEVICE AND METHOD

(71) Applicant: NXP B.V., Eindhoven (NL)

(72) Inventors: Giten Kulkarni, Bangalore (IN); Gulab Yadava, Bangalore (IN)

(73) Assignee: NXP B.V., Eindhoven (NL)

( * ) Notice: Subject to any disclaimer, the term of this patent is extended or adjusted under 35 U.S.C. 154(b) by 0 days. days.

(21) Appl. No.: 15/448,939

(22) Filed: Mar. 3, 2017

(65) Prior Publication Data

US 2017/0257732 A1    Sep. 7, 2017

(30) Foreign Application Priority Data

Mar. 3, 2016   (EP) .................................... 16158438

(51) Int. Cl.
*H04B 5/00* (2006.01)
*H04W 4/00* (2018.01)
*H04W 52/02* (2009.01)
*H04W 76/06* (2009.01)
*H04W 76/02* (2009.01)

(52) U.S. Cl.
CPC ....... *H04W 4/008* (2013.01); *H04W 52/0232* (2013.01); *H04W 52/0235* (2013.01); *H04W 76/02* (2013.01); *H04W 76/06* (2013.01)

(58) Field of Classification Search
CPC ............. H04W 4/008; H04W 52/0235; H04W 52/0232; H04W 76/02; H04W 76/06
USPC ....................................... 455/41.1
See application file for complete search history.

(56) References Cited

U.S. PATENT DOCUMENTS

| 2009/0146796 A1* | 6/2009 | Goto ................ H04B 5/02 340/10.51 |
| 2011/0117847 A1 | 5/2011 | Nakagawa |
| 2013/0143487 A1* | 6/2013 | Hillan ................ G06K 7/10009 455/41.1 |
| 2013/0196595 A1 | 8/2013 | Byrne et al. |
| 2013/0309965 A1* | 11/2013 | Hillan ................ H04M 1/7253 455/41.1 |
| 2014/0073242 A1* | 3/2014 | Chen ................ H04B 5/0056 455/41.1 |
| 2014/0196142 A1* | 7/2014 | Louboutin .......... G06F 21/44 726/16 |

OTHER PUBLICATIONS

Extended European Search Report for Patent Appln. No. 16158438.8 (dated Aug. 16, 2016).

* cited by examiner

*Primary Examiner* — Raj Chakraborty (57) ABSTRACT

According to a first aspect of the present disclosure, an NFC device is provided which comprises: a transceiver unit configured to establish a communication channel between the NFC device and a further NFC device, said further NFC device being external to the NFC device; a power management unit configured to detect an inactive communication state of said communication channel and to cause the transceiver unit to enter into a power management mode in response to a detection of said inactive communication state. According to a second aspect of the present disclosure, a corresponding method for managing power in an NFC device is conceived. According to a third aspect of the present disclosure, a corresponding computer program product is provided.

18 Claims, 5 Drawing Sheets

NFC POWER MANAGEMENT DEVICE AND METHOD

CROSS-REFERENCE TO RELATED APPLICATIONS

This application claims priority under 35 U.S.C. § 119 of European patent application no. 16158438.8, filed on Mar. 3, 2016, the contents of which are incorporated by reference herein.

FIELD

The present disclosure relates to an NFC device. Furthermore, the present disclosure relates to a method for managing power in an NFC device and to a corresponding computer program product.

BACKGROUND

Near field communication (NFC) enables the wireless transmission of data over relatively short distances. NFC technology enables simple and safe two-way interactions between electronic devices, allowing consumers to perform contactless transactions, access digital content, and connect electronic devices with a single touch. NFC complements many popular consumer-level wireless technologies by utilizing the key elements in existing standards for contactless smart card technology. NFC is compatible with existing contactless smart card infrastructures and thus it enables a consumer to utilize one device across different systems. There are various types of NFC devices, for example simple NFC tags, stickers or cards, NFC-enabled mobile devices such as smart phones, and NFC readers integrated in point-of-sale (POS) terminals. An NFC tag or NFC card is usually a passive device, i.e. it does not have its own power source but instead it is powered by a field generated by another NFC device, such as an NFC reader. More complex NFC devices may operate in different modes, specifically: a reader/writer mode, which allows an NFC device to read and/or write passive NFC tags and stickers; a peer-to-peer mode, which allows the NFC device to exchange data with other NFC peer devices; a Host Card Emulation (HCE) mode, which allows the NFC device to act as an NFC card. An emulated NFC card can be accessed by an external NFC reader, such as an NFC point-of-sale terminal. Host Card Emulation (HCE) is the presentation of a virtual and exact representation of a smart card using only software.

SUMMARY

According to a first aspect of the present disclosure, an NFC device is provided which comprises: a transceiver unit configured to establish a communication channel between the NFC device and a further NFC device, said further NFC device being external to the NFC device; a power management unit configured to detect an inactive communication state of said communication channel and to cause the transceiver unit to enter into a power management mode in response to a detection of said inactive communication state.

In one or more embodiments, the power management unit is further configured to detect said inactive communication state by monitoring application-level communication between the NFC device and the further NFC device.

In one or more embodiments, the application-level communication comprises transmit and receive operations performed by the transceiver unit.

In one or more embodiments, said transmit and receive operations comprise transmitting commands, receiving responses and time-out operations.

In one or more embodiments, the power management unit is further configured, upon or after detection of said inactive communication state, to cause the transceiver unit to disconnect the communication channel.

In one or more embodiments, the power management unit is further configured, upon or after detection of said inactive communication state, to cause the transceiver unit and to enter into a periodic polling mode.

In one or more embodiments, the power management unit is further configured to cause the transceiver unit to reduce the polling frequency in said periodic polling mode.

In one or more embodiments, the power management unit is further configured to cause the transceiver unit to poll only for devices having a type which is different from the type of said further NFC device.

In one or more embodiments, the power management unit is further configured to store an identifier of said further NFC device.

In one or more embodiments, the power management unit is further configured to prevent the transceiver unit from establishing a new communication channel, upon or after verifying that a newly received identifier matches the stored identifier.

In one or more embodiments, the power management unit is further configured to detect one or more conditions for exiting the power management mode, and the power management unit is further configured to cause the transceiver unit to exit the power management mode upon or after detection of said conditions.

In one or more embodiments, the one or more conditions include a change in the RF load on the transceiver unit.

In one or more embodiments, the NFC device is an NFC-enabled mobile device acting as an NFC reader, an NFC reader integrated in a terminal or an NFC peer device.

According to a second aspect of the present disclosure, a method for managing power in an NFC device is conceived, the method comprising: establishing, by a transceiver unit of said NFC device, a communication channel between the NFC device and a further NFC device, said further NFC device being external to the NFC device; detecting, by a power management unit of said NFC device, an inactive communication state of said communication channel; causing, by said power management unit, the transceiver unit to enter into a power management mode in response to a detection of said inactive communication state.

According to a third aspect of the present disclosure, a tangible, non-transitory computer program product is provided that comprises instructions for execution by a processing unit which, when executed by the processing unit, cause said processing unit to carry out or control a method of the kind set forth.

DESCRIPTION OF DRAWINGS

Embodiments will be described in more detail with reference to the appended drawings, in which.

DESCRIPTION OF EMBODIMENTS

Since the amount and use of NFC devices have increased, a user often has different NFC devices which intentionally or unintentionally remain in close proximity of each other. This may have a negative impact on the power consumption of said devices. For example, the following scenarios may be envisaged. An NFC tag or card may be placed in a flip cover of an NFC-enabled mobile phone. In this case, every time the user flips the cover to operate the phone, the NFC modem or transceiver of the phone will be switched on and it will detect the NFC tag/card placed in the flip cover. Subsequently, it will establish a communication channel with the NFC tag/card. Consequently, the NFC modem is in full power mode and it draws power from the phone's battery, while, when the user is using another mobile function (e.g., phone call, internet browsing) there is no requirement of communication with the detected NFC tag/card. In another example, two NFC devices may have been left in proximity of each other, in which case they may connect to each other while there is no requirement for communication. If the NFC devices are connected in peer-to-peer mode, the NFC transceivers in both devices may drain power from the devices' batteries.

Furthermore, in yet another example, an NFC-enabled mobile device may be placed inadvertently on an NFC card (e.g., an NFC-enabled credit card or office access tag). Again, the NFC transceiver of the mobile device may unnecessarily drain power from the device's battery. Although the mobile device may have a power management function, it may wait with switching off the NFC transceiver until the device enters into sleep mode, for example. Since this may take a significant amount of time, power may be consumed for quite some time. In a further example a user may again flip the cover of a mobile phone, and an NFC tag or card in the cover may be detected, which triggers the NFC transceiver in the phone to establish a communication channel. This communication channel will normally not be disconnected before the NFC card/tag is removed from the RF field generated by said transceiver. Thus, if the user actually wants to communicate with another NFC tag, card or peer device, then this will not be possible. More specifically, the new NFC device (tag/card/peer) which is brought into proximity of the phone will only be detected in a new RF poll cycle, which will only take place when the flip-cover tag/card is no longer close to the transceiver. This may result in functionality loss. For instance, the user may have to keep the cover half open, so that the flip-cover tag/card is not in proximity and then bring the new NFC device into proximity, which is inconvenient.

As mentioned above, according to a first aspect of the present disclosure, an NFC device is provided which comprises: a transceiver unit configured to establish a communication channel between the NFC device and a further NFC device, said further NFC device being external to the NFC device; a power management unit configured to detect an inactive communication state of said communication channel and to cause the transceiver unit to enter into a power management mode upon or after detection of said inactive communication state. By detecting an inactive communication state of said channel, and subsequently triggering the transceiver unit to enter into a power management mode, it may be avoided that unnecessary power is consumed by the NFC device while it is in proximity of the further NFC device.

Figure 1:
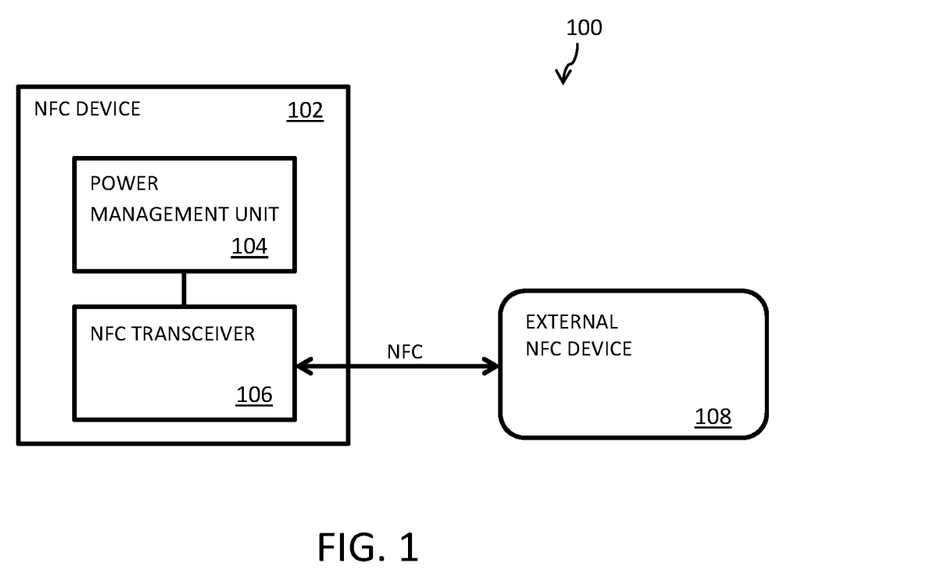
FIG. 1 shows an illustrative embodiment of an NFC system.

FIG. 1 shows an illustrative embodiment of an NFC system 100. The system 100 comprises an NFC device 102 of the kind set forth and a further, external NFC device 108. The NFC device 102 may be an NFC-enabled mobile device acting as an NFC reader, such as a smart phone or a tablet, or an NFC reader integrated in a point-of-sale (POS) terminal, for example. The external NFC device 108 may be an NFC tag, an NFC card or an NFC-enabled mobile device operating in peer-to-peer mode. In a specific example, the NFC device 102 may be a mobile phone containing a flip cover in which the further NFC device 108 (e.g., an NFC-enabled smart card) is stored. The NFC device 102 comprises a power management unit 104 which is operatively connected to an NFC transceiver 106. In operation, the NFC transceiver 106 may establish a communication channel with the external NFC device 108 by generating an RF field and execute a polling procedure; subsequently, when the presence of the external NFC device 108 is detected, the NFC channel may be established. Normally, when the external NFC device 108 has been brought intentionally into proximity of the NFC device 102, data will be communicated through the NFC channel. However, in accordance with the present disclosure, the power management unit 104 is configured to detect that the NFC channel has an inactive communication state. If this is the case, the power management unit 104 may trigger the NFC transceiver 106 to enter into a power management mode in which appropriate power saving measures may be taken.

It is noted that the NFC transceiver 106 may be a commonly available integrated circuit component. Furthermore, the power management unit 104 may be a software-implemented block designed to control functions of the NFC transceiver 106. The power management unit 104 may for example be embedded in a microcontroller or processing unit (not shown) that controls the NFC transceiver 106, or form a separate module. Furthermore, it is conceivable that the power management unit 104 is at least partly embedded in the NFC transceiver 106.

Figure 2:
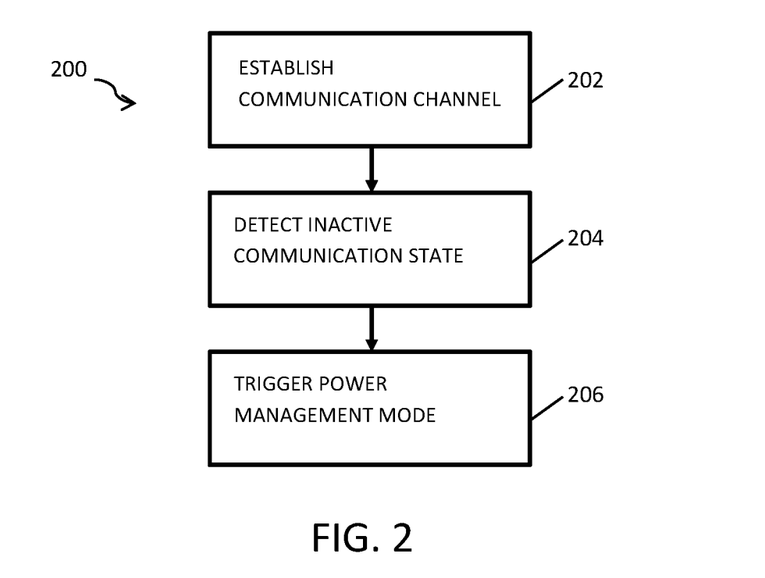
FIG. 2 shows an illustrative embodiment of a power management method.

FIG. 2 shows an illustrative embodiment of a power management method 200. The method comprises, at 202, establishing, by the transceiver unit 106, a communication channel between the NFC device 102 and the external NFC device 108. Furthermore, the method comprises, at 204, detecting, by the power management unit 104, an inactive communication state of the communication channel, and at 206, triggering the transceiver unit 106 to enter into a power management mode upon or after detection of the inactive communication state.

As mentioned above, in one or more embodiments, the power management unit 104 may detect the inactive communication state by monitoring application-level communication between the NFC device 102 and the external NFC device 108. Thereby, detecting the inactive communication state may be facilitated. For instance, the power management unit 104 may trigger the transceiver unit 106 to enter into the power management mode if no application-level communication has taken place for a predefined amount of time. This amount of time may also be configurable, so as to achieve a balance between fast entry into the power management mode and the avoidance of use case interference.

Furthermore, the NFC device 102 may comprise an application processor (not shown) or another processing unit that exchanges data with the external NFC device 108 through the NFC transceiver 106. In that case, the NFC transceiver 106 may enable the data exchange by performing transmit operations and receive operations. In one or more embodiments, the power management unit 104 may detect the inactive communication state by monitoring these transmit operations and receive operations. Thereby, said detection may be further facilitated. For instance, operations which are easy to monitor include, but are not limited to, the transmission of commands by the NFC transceiver 106, the receipt of responses by the NFC transceiver 106, and time-out operations performed by the NFC transceiver 106. The time-out operation may include verifying whether a response to a specific command has been received from the external NFC device 108, and generating a time-out when the response has not been received. In a non-limiting example of said monitoring, a command may be transmitted and a response received, subsequently no other command may be transmitted for a predefined amount of time, and thus it is concluded that the communication is inactive. In another non-limiting example, a command may be transmitted, but no response may be received for a predefined amount of time, as a result a time-out may be generated, subsequently no other command may be transmitted for a predefined amount of time, and thus it is concluded that the communication is inactive.

In one or more embodiments, the power management unit 104 is further configured, upon or after detection of the inactive communication state, to cause the NFC transceiver 106 to disconnect the communication channel and to enter into a periodic polling mode. In this non-limiting example of a power saving measure, the power consumption may be reduced significantly because no battery power needs to be used to maintain the communication channel. Furthermore, in one or more embodiments, the power management unit 104 is further configured to trigger the NFC transceiver 106 to reduce the polling frequency. Although periodic polling requires less energy than maintaining the communication channel, battery power is still used. Thus, reducing the polling frequency may further reduce the power consumption. The inventors have realized that it is probable that only the external NFC device 108 that is already in proximity will be detected during said polling, and that consequently there is no need for a high polling frequency.

Furthermore, in one or more embodiments, the power management unit 104 is also configured to trigger the NFC transceiver 106 to poll only for devices having a type which is different from the type of the external NFC device 108. In this way, it can be prevented that a new and probably unused communication channel is set up with the external NFC device 108, while it allows detecting an external NFC device of another type when it enters the RF field of the NFC device 102. There are standardized types of NFC devices, such as those defined by the NFC Forum, and proprietary types of NFC devices. For instance, in case the external NFC device 108 is an NFC Forum Type 2 Tag, the NFC transceiver 106 may poll for all devices not being of Type 2, i.e. only for NFC Forum Type 1/3/4 Tags and proprietary types of NFC devices. If a device of such another type has been detected, the NFC transceiver 106 may exit the power management mode and establish a communication channel with the new device.

In one or more embodiments, the power management unit 104 is further configured to store an identifier of the external NFC device 108, for example upon or after detection of the inactive communication state. This may enable ignoring the external NFC device 108 if it is again detected by the polling process performed in the power management mode. In particular, it may not be desirable to ignore all NFC devices of a particular type, because it may be the user's intention to communicate with another external NFC device of the same type. By storing an identifier of the external NFC device 108 when entering the power management mode (e.g., a unique number stored on said NFC device 108 and provided to the NFC transceiver 106) it can be verified whether the same device is again detected, and if so, it may be ignored. In a practical and efficient implementation, the power management unit 104 may prevent the NFC transceiver 106 from establishing a new communication channel upon or after verifying that a newly received identifier matches the stored identifier.

In one or more embodiments, the power management unit is further configured to detect one or more conditions for exiting the power management mode, and the power management unit is further configured to cause the transceiver unit to exit the power management mode upon or after detection of said conditions. An example of such an exit condition is a change in the RF load on the NFC transceiver 106. Thus, the power management unit 104 may be configured to detect a change in the RF load on the NFC transceiver 106 and to cause the NFC transceiver 106 to exit the power management mode upon or after detection of said change. The change of the RF load provides a good indication of the presence of a new external NFC device in the field generated by the NFC transceiver 106, which in turn may be indicative of a user's intention to start communication with another NFC device. An external NFC device appears as a certain load on the RF field generated by the NFC transceiver 106. When another external NFC device enters this RF field, it may lead to a change in this load. Thus, the NFC transceiver 106 may monitor the load on its RF field and thus detect such change of the RF load, in order to determine that a new NFC device enters the field. In that case, the NFC transceiver 106 may exit the power management mode and establish a communication channel with the new NFC device. The skilled person will appreciate that the change detection process may use a configurable threshold, in that the NFC transceiver 106 may conclude that a new NFC device has entered the field only if the change of the RF load exceeds said threshold. Furthermore, a hysteresis value may be taken into account. Both the threshold and the hysteresis value may facilitate the avoidance of false detections.

Figure 3:
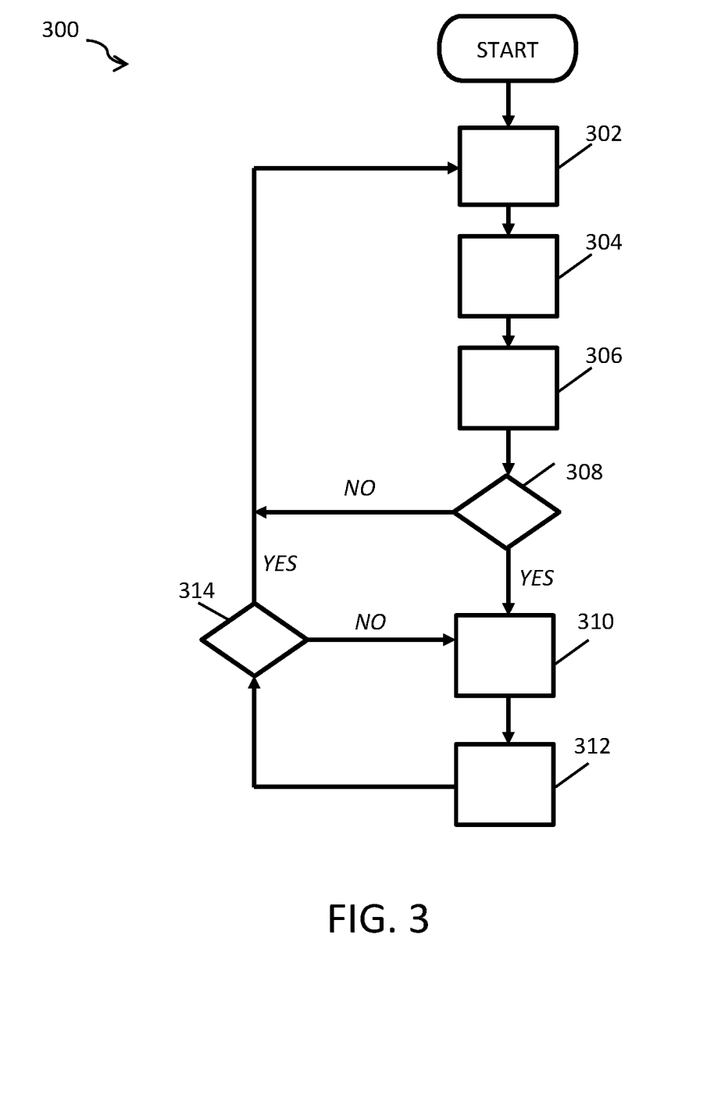
FIG. 3 shows an illustrative embodiment of an implementation of a power management method of the kind set forth.

FIG. 3 shows an illustrative embodiment of an implementation of a power management method of the kind set forth. In particular, it shows a high-level sequence of events in a power saving method of the kind set forth. In this example, after an NFC tag or NFC peer device has been detected at 302 and an application executed by an NFC device of the kind set forth has communicated with said tag or peer device at 304, an inactive communication state detection process is started at 306. Note that in this example the inactive communication state is called a perpetual NFC ON situation, which refers to the fact that the communication channel remains established while no actual communication takes place. When such a state is detected at 308, the NFC transceiver enters the power management mode at 310. In this mode, appropriate power saving measures may be taken. Furthermore, an exit condition detection process for detecting one or more conditions for exiting said power management mode may be started at 312; an example of such a condition (i.e., criterion) may be the above-mentioned change of the RF load. When such a condition has been detected at 314, the NFC transceiver may return to a normal operating mode.

Figure 4:
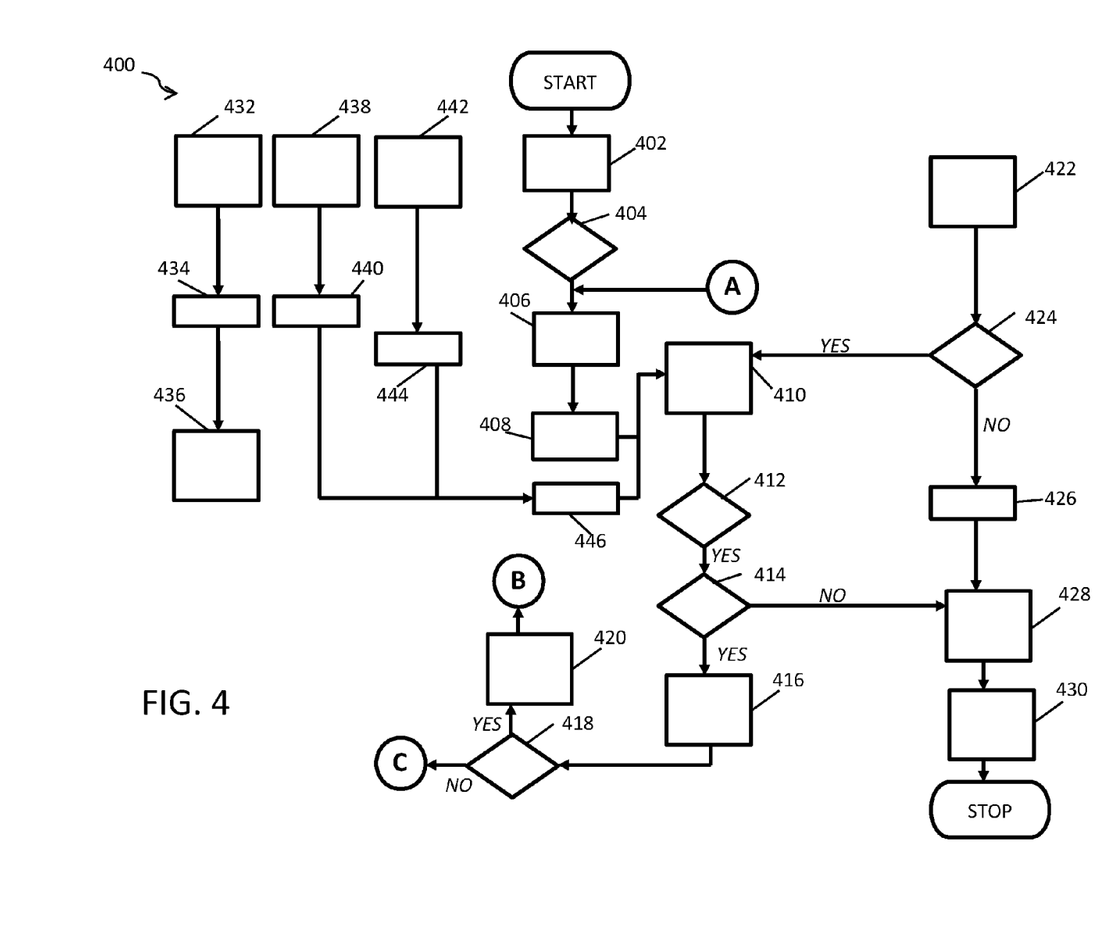
FIG. 4 shows an illustrative embodiment of a further implementation of a power management method of the kind set forth.

FIG. 4 shows an illustrative embodiment of a further implementation of a power management method of the kind set forth. In particular, FIG. 4 shows a lower-level sequence of events in a power saving method of the kind set forth. In this example, blocks 408, 410, 412, 414, 416, 418 and 446 represent events associated with the detection of the inactive communication state. Furthermore, block 420 represents an event associated with entering into the power management mode. Furthermore, blocks 426, 428, 430 and 436 represent blocks associated with exiting the power management mode and returning to the normal operating mode. The remaining blocks represent events associated with the normal operating mode of the NFC transceiver. The sequence of events 432, 434, 436 may run in parallel to other sequences, such as the sequence of events 438, 440 and the sequence of events 442, 444. The sequence of events 432, 434, 436 indicates that operating the NFC transceiver in power management mode is no longer required if the NFC device's screen is locked or switched off, because in that case the NFC channel will be disconnected anyhow. The sequence of events 442, 444 indicates that the occurrence of transmit and receive operations ("transceiver operations") re-starts the timer, which effectively delays entering the power management mode. As explained above, in one or more embodiments the absence of transmit and receive operations during a predefined amount of time may trigger the NFC transceiver to enter into the power management mode. Concurrently, applications executed by the NFC device's processing unit may attempt to connect or reconnect 440 to the NFC transceiver, in order to initiate a data exchange with an external NFC device. This event 440 may also be used as a trigger to re-start the timer, thus effectively delaying entering the power management mode. It is noted that entry point A and exit points B and C show how the sequence of events relates to the sequences of events shown in FIG. 5 and FIG. 6.

Figure 5:
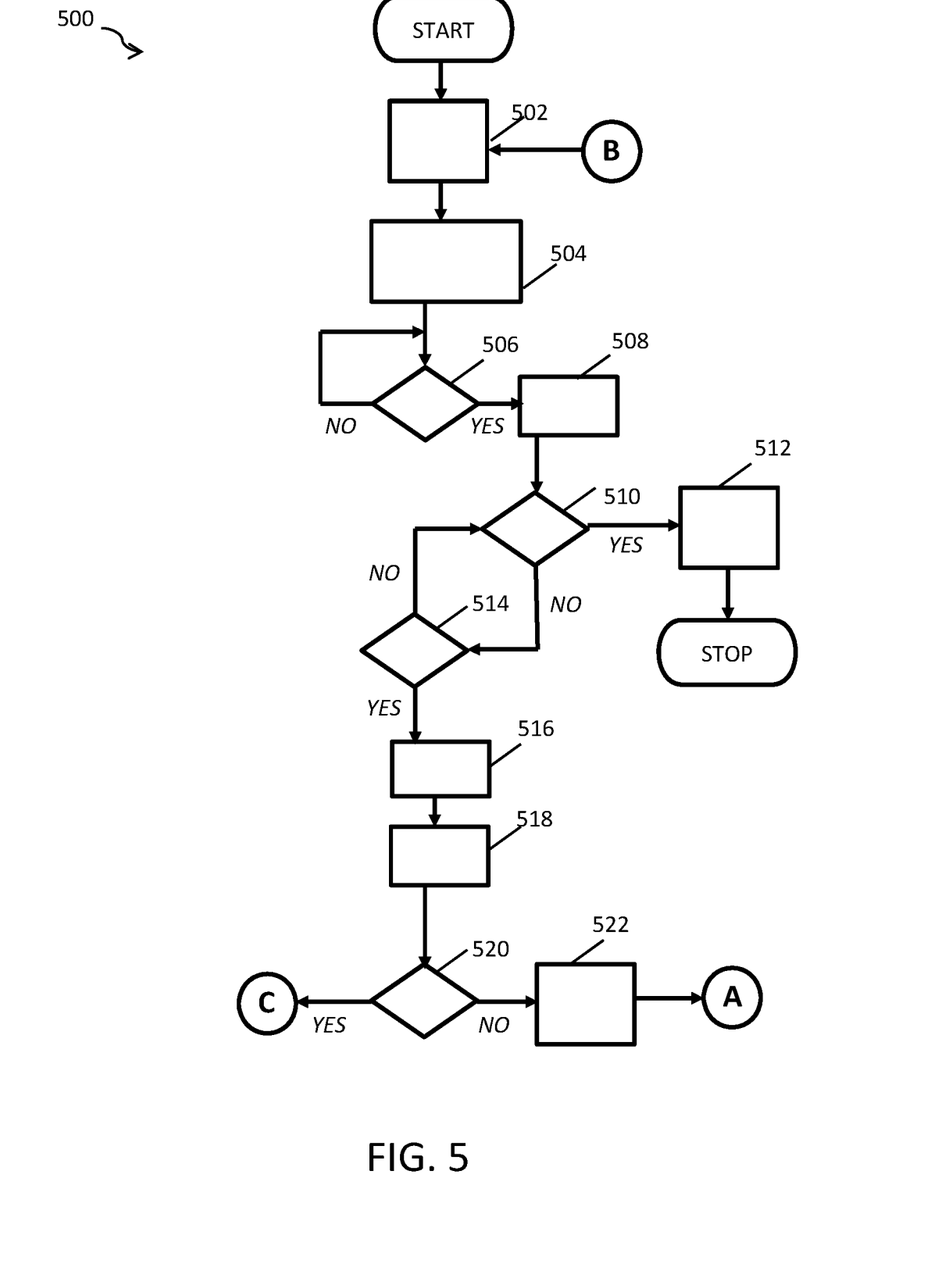
FIG. 5 shows an illustrative embodiment of a further implementation of a power management method of the kind set forth.

FIG. 5 shows an illustrative embodiment of a further implementation of a power management method of the kind set forth. In particular, FIG. 5 shows another part of lower-level sequence of events in a power saving method of the kind set forth. The sequence of events shown in this example is associated with the power management mode. A second timer, as used in events 508 and 510, may serve to check whether the power management mode should still be applied. The second timer value is preferably short. If no tag is present in the RF field after this time has expired, the power management mode may be exited at 512. Thus, event 512 is associated with exiting the power management mode. If a tag is detected, but the newly received identifier of said tag matches 520, upon comparison 518, a stored identifier, then the tag may be ignored and the sequence of events shown in FIG. 6 may be started. Otherwise the detected tag may be added to the cache at event 522.

Figure 6:
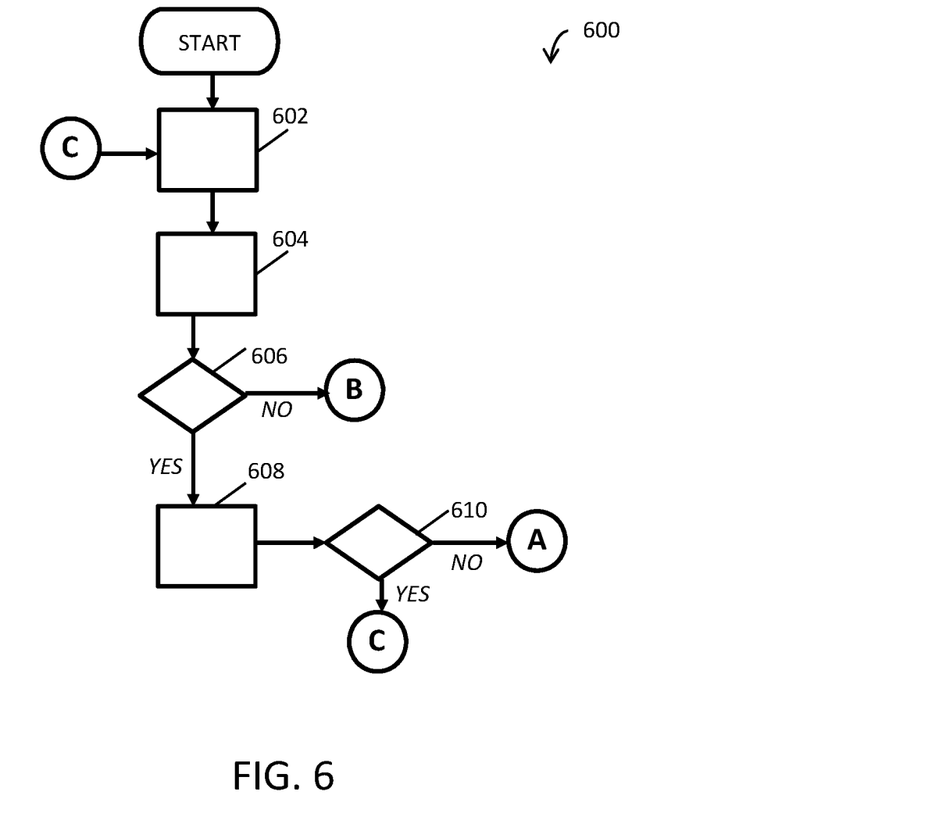
FIG. 6 shows an illustrative embodiment of a further implementation of a power management method of the kind set forth.

FIG. 6 shows an illustrative embodiment of a further implementation of a power management method of the kind set forth. In particular, FIG. 6 shows another part of lower-level sequence of events in a power saving method of the kind set forth. The sequence of events shown in this example is associated with detecting the inactive communication mode. It is emphasized that the examples shown in FIG. 3 to FIG. 6 are merely illustrative. That is to say, the skilled person will appreciate that different implementations are possible without departing from the scope of the present disclosure.

The systems and methods described herein may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 NFC system
102 NFC device
104 power management unit
106 NFC transceiver
108 external NFC device
200 power management method
202 establish communication channel
204 detect inactive communication state
206 trigger power management mode
300 method implementation
302 tag or peer device detection
304 application communicates with tag or peer device
306 detect perpetual NFC ON situation
308 is perpetual NFC ON?
310 power management
312 exit criteria detection
314 exit criteria detected?
400 method implementation
402 poll is running
404 tag or peer device detected?
406 notify tag or peer device detection
408 start timer (perpetual device in proximity)
410 wait for timeout
412 timeout?
414 device in proximity?
416 stop device-in-proximity check
418 all poll phases of poll executed?
420 apply power management
422 start proximity check
424 device in proximity?
426 stop timer
428 clear all tag or peer device information and re-initialize power management related information
430 restart poll and other required operations
432 application/system service
434 screen lock/off
436 stop power management
438 application
440 connect/reconnect
442 application
444 transceive( )
446 re-start timer
500 method implementation
502 reconfigure poll process with poll phase disabled and listen enabled or increased listen time
504 start poll postponement timer
506 timer expired?
508 restart poll and second timer
510 second timer expired?
512 stop power management
514 tag(s) or peer device(s) detected?
516 stop second timer
518 compare with saved information
520 exact match found?
522 prepare tag or peer device information with new tag or peer device, reset power management related counter and add tag or peer device to the cache
600 method implementation
602 reconfigure poll process by removing technology type of already found tags or peer devices and increase poll duration
604 start timer with timeout value of one poll duration
606 tag or peer device detected before timeout?
608 add tag or peer device information to the cache
610 match found?

The invention claimed is:

1. An NFC device comprising:
a transceiver, including circuitry, configured to establish a communication channel between the NFC device and a further NFC device, said further NFC device being external to the NFC device and being within sufficient proximity of the NFC device to establish the communication channel; and
power management circuitry configured to detect an inactive communication state of said communication channel while the communication channel is active and while the further NFC device remains within the proximity of the NFC device, and to cause the transceiver to enter into a power management mode in response to a detection of said inactive communication state and while the NFC device is not in a sleep mode.

2. An NFC device as claimed in claim 1, wherein the power management circuitry is further configured to detect said inactive communication state by monitoring application-level communication between the NFC device and the further NFC device.

3. An NFC device as claimed in claim 2, wherein the application-level communication comprises transmit and receive operations performed by the transceiver, wherein the transmit operation includes the transceiver configured to transmit commands and the receive operation including the transceiver configured to receive commands.

4. An NFC device as claimed in claim 3, wherein the power management circuitry is further configured to detect said inactive communication state by identifying a last occurring transmit or receive operation occurred greater than a threshold time ago, the threshold time being associated with a time-out operation.

5. An NFC device as claimed in claim 1, wherein the power management circuitry is further configured, upon or after detection of said inactive communication state, to cause the transceiver to disconnect the communication channel.

6. An NFC device as claimed in claim 5, wherein the power management circuitry is further configured, upon or after detection of said inactive communication state, to cause the transceiver and to enter into a periodic polling mode, while the further NFC device is within the proximity of the NFC device.

7. An NFC device as claimed in claim 6, wherein the power management circuitry is further configured to cause the transceiver to reduce the polling frequency in said periodic polling mode in response to the further NFC device remaining within the proximity of the NFC device.

8. An NFC device as claimed in claim 6, wherein the power management circuitry is further configured to cause the transceiver to poll only for devices having a type which is different from the type of said further NFC device in response to determining the further NFC device remains within the proximity of the NFC device.

9. An NFC device as claimed in claim 1, wherein the power management circuitry is further configured to store an identifier of said further NFC device.

10. An NFC device as claimed in claim 9, wherein the power management circuitry is further configured to prevent the transceiver from establishing a new communication channel with said further NFC device, upon or after verifying that a newly received identifier matches the stored identifier and in response to determining the further NFC device remains within the proximity of the NFC device.

11. An NFC device as claimed in claim 1, wherein the power management circuitry is further configured to detect one or more conditions for exiting the power management mode, and wherein the power management circuitry is further configured to cause the transceiver to exit the power management mode upon or after detection of said conditions.

12. An NFC device as claimed in claim 11, wherein the one or more conditions include a change in the RF load on the transceiver.

13. An NFC device as claimed in claim 1, being an NFC-enabled mobile device acting as an NFC reader, an NFC reader integrated in a terminal or an NFC peer device.

14. An NFC device as claimed in claim 1, further including processing circuitry configured and arranged to switch the transceiver off and enter the NFC device into a sleep mode in response to a screen of the NFC device locking or switching off.

15. An NFC device as claimed in claim 1, wherein the power management circuitry is further configured to exit the power management mode and to establish a new communication channel between the NFC device and an additional NFC device in response to detecting the additional NFC device is in proximity to the NFC device sufficient to establish the new communication channel and verifying that the additional NFC device is not the further NFC device.

16. An NFC device as claimed in claim 1, wherein the power management circuitry is further configured to enter the power management mode includes causing the transceiver to periodically poll for additional NFC device while the further NFC device remains in the proximity of the NFC device.

17. A method for managing power in an NFC device, comprising:
    establishing, by transceiver circuitry of said NFC device, a communication channel between the NFC device and a further NFC device, said further NFC device being external to the NFC device and within sufficient proximity of the NFC device to establish the communication channel;
    detecting, by power management circuitry of said NFC device, an inactive communication state of said communication channel while the communication channel is active and while the further NFC device is within the proximity of the NFC device; and
    causing, by said power management circuitry, the transceiver circuitry to enter into a power management mode in response to a detection of said inactive communication state and while the NFC device is not in a sleep mode.

18. A tangible, non-transitory computer program product comprising instructions for execution by processing circuitry which, when executed by the processing circuitry, cause said processing circuitry to carry out or control a method as claimed in claim 17.

* * * * *